Nov. 17, 1959   R. C. MACHLER ET AL.   2,912,862
RADIATION MEASUREMENT OF NON-OPAQUE BODIES
Filed Dec. 9, 1953   6 Sheets-Sheet 1
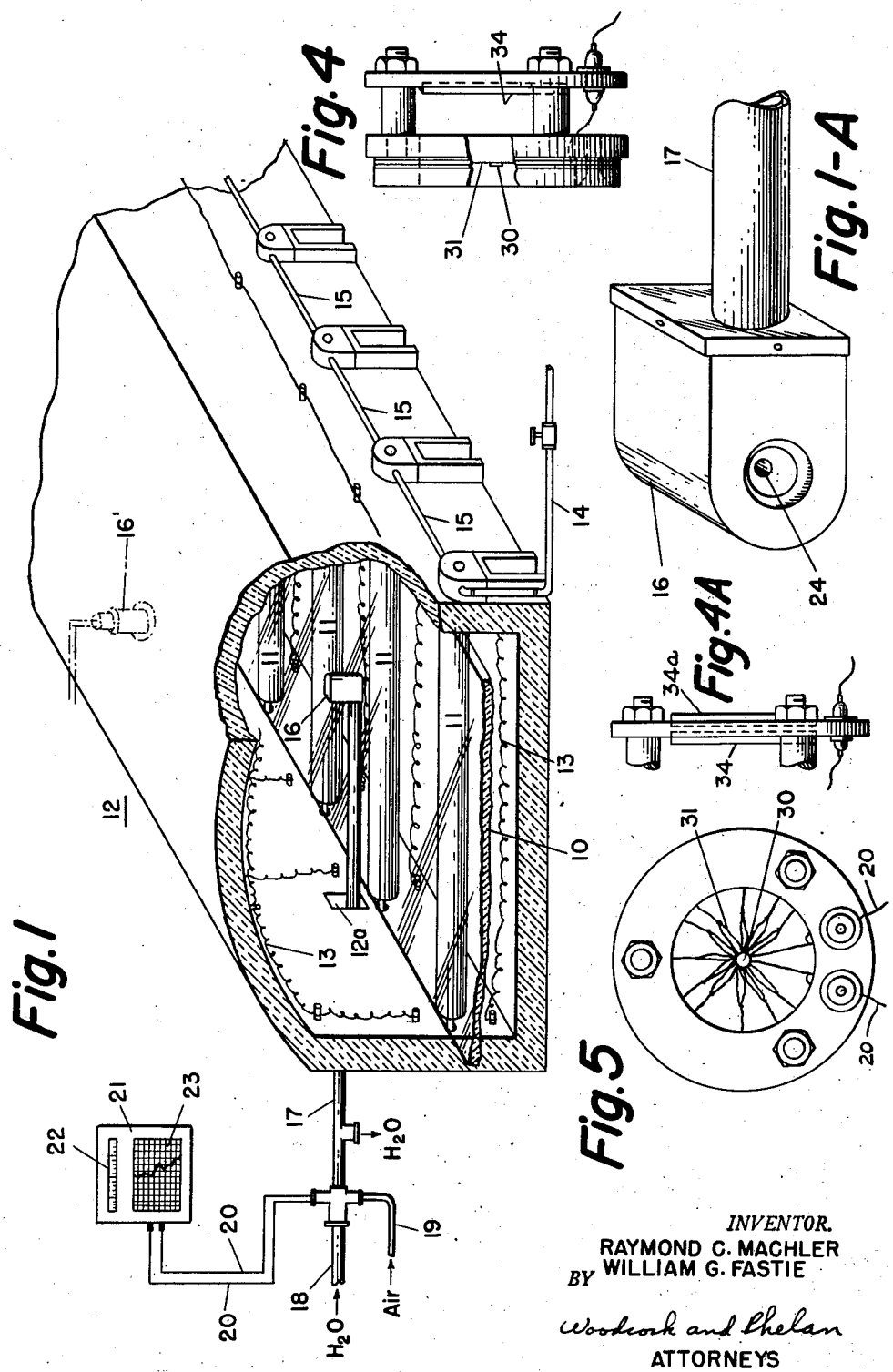
INVENTOR.
RAYMOND C. MACHLER
BY WILLIAM G. FASTIE
Woodcock and Phelan
ATTORNEYS

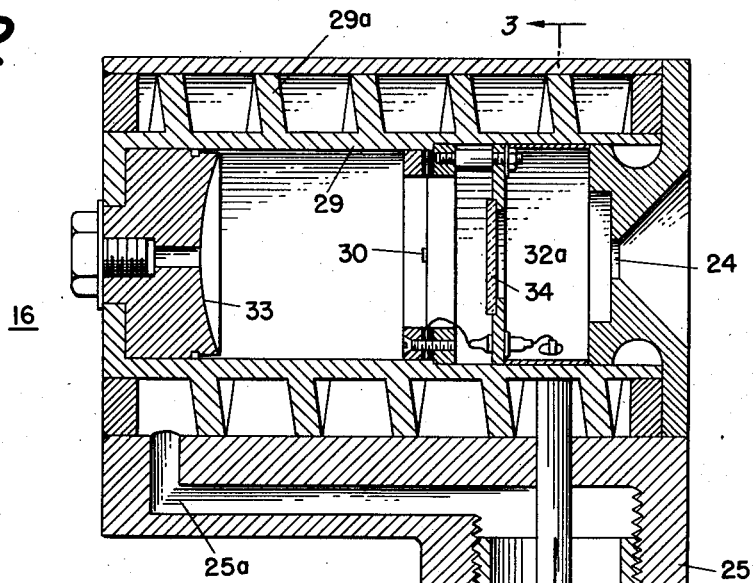
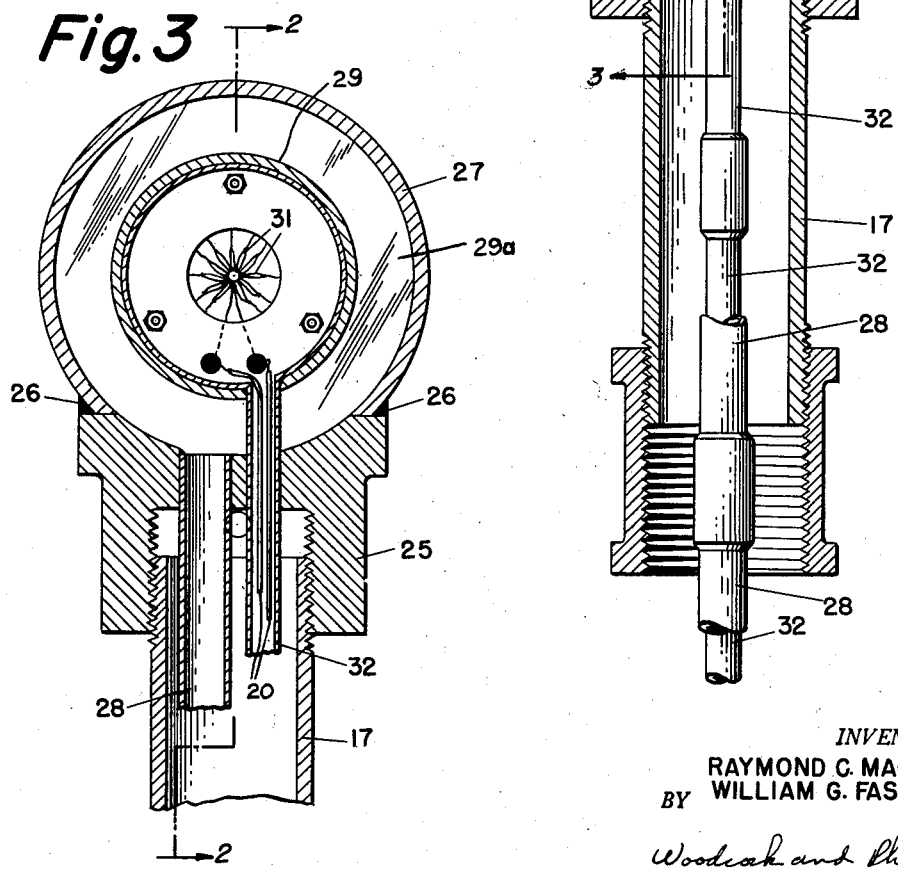

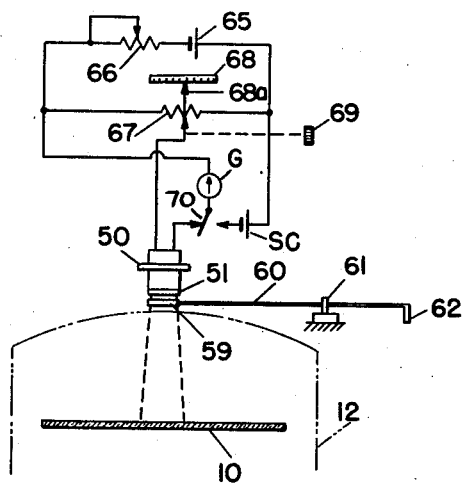
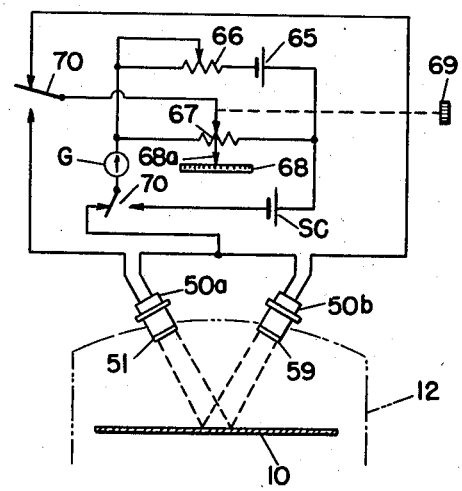
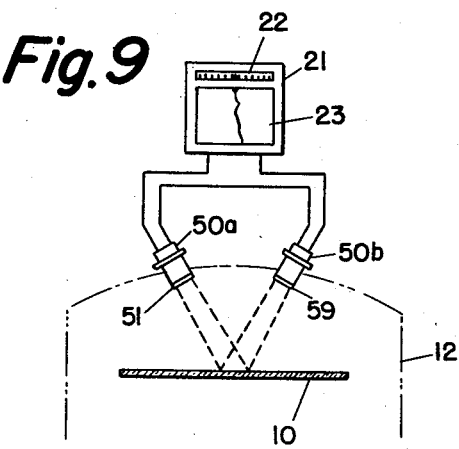
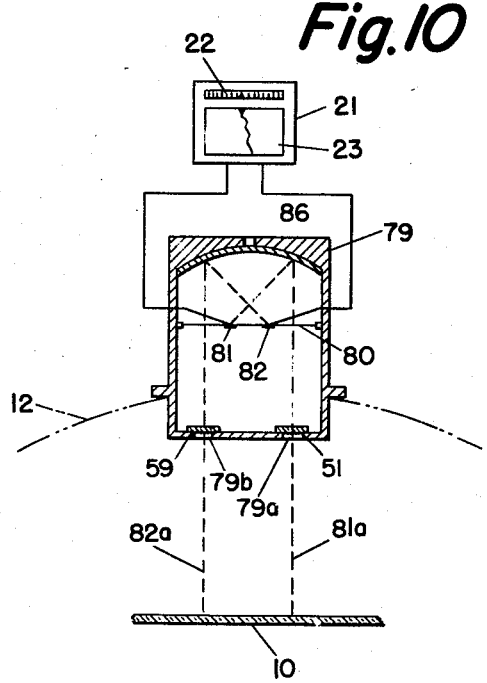
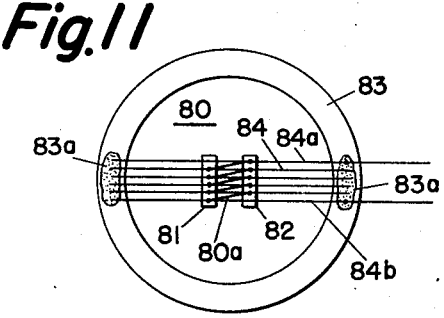

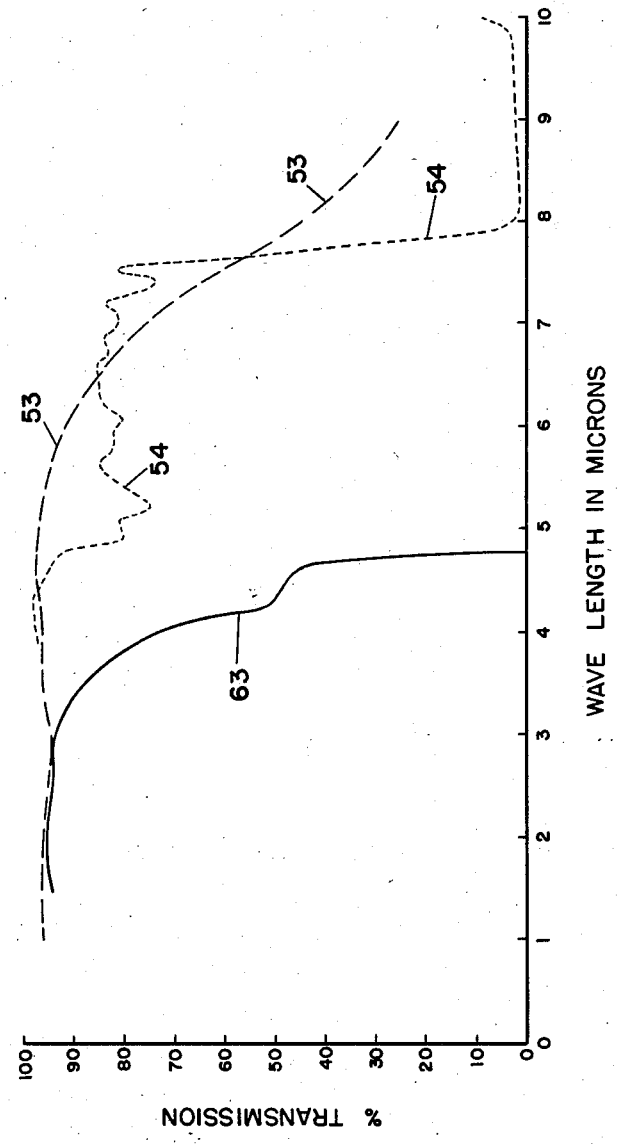

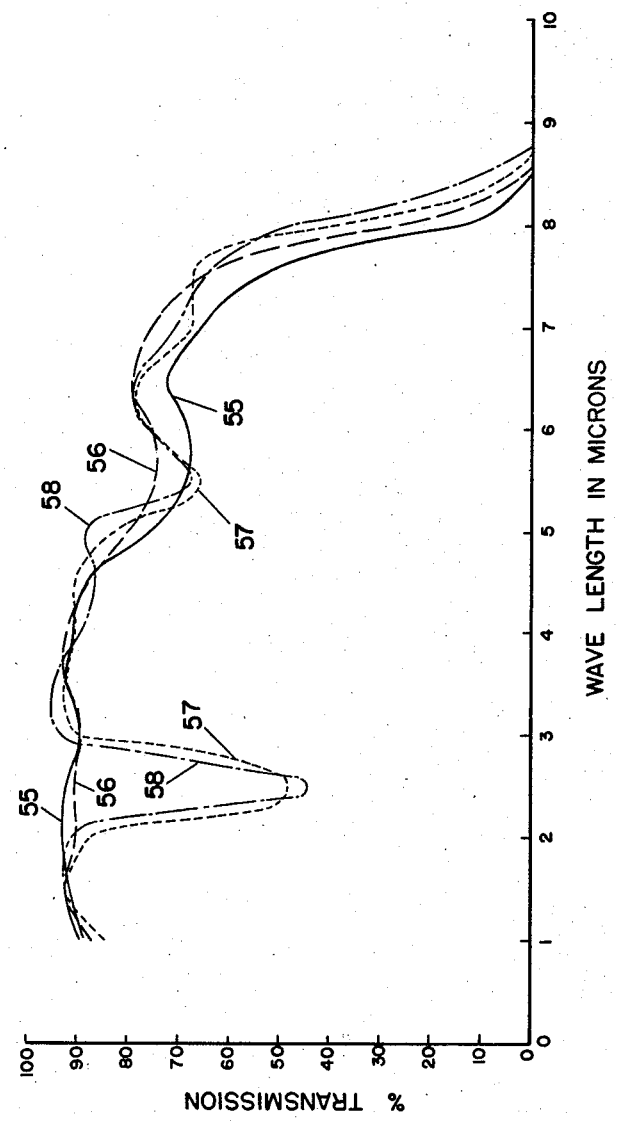

United States Patent Office 2,912,862
Patented Nov. 17, 1959

2,912,862

RADIATION MEASUREMENT OF NON-OPAQUE BODIES

Raymond C. Machler, Philadelphia, Pa., and William G. Fastie, Owings Mills, Md., assignors to Leeds and Northrup Company, Philadelphia, Pa., a corporation of Pennsylvania Application December 9, 1953, Serial No. 397,114

16 Claims. (Cl. 73—355)

This invention relates to the measurement of the temperature of non-opaque bodies such as glass and glass-like materials, whether natural or synthetic, and has for an object the provision of systems for determining the temperature of such bodies by radiation.

This application is a continuation-in-part of earlier filed application, Serial No. 131,482 filed December 6, 1949, now abandoned.

Heretofore total radiation pyrometers have not been satisfactory for the measuremet of the temperature of thin hot glass due to the fact that the glass is translucent or transparent and transmits radiation from the background areas which may be, and frequently are, at a temperature other than that of the glass. Such background areas may be separate from the glass, for example, heating elements present in a glass lehr, or they may be integral with the glass such as layers of the glass mass below the surface layer particularly where the glass is relatively thick and the sub-surface temperature differs from its surface temperature. Additionally, the glass will reflect radiant energy from any external source of unknown temperature and thus the radiation pyrometer may receive reflected radiant energy which may be a further source of error.

In accordance with the present invention there is provided a system for measuring the temperatures of translucent materials, such as glass, under conditions wherein the translucent material may be subject to background radiation from sources at different temperatures which system avoids measurement errors due to transmission of background radiation through said material. Such a system comprises radiant-energy sensitive means disposed to be heated by radiant energy from the translucent material. The system further comprises radiant-energy selective means disposed in the optical path between the radiant-energy sensitive means and the translucent material. The radiant-energy selective means has the characteristic of transmitting to the radiant-energy sensitive means radiant energy of wavelengths in a spectral region throughout which the translucent material has maximum emissivity, that is to say in the order of .95 or greater. The radiant-energy selective means has the further characteristic of blocking the transmission of radiant energy of wavelengths shorter than said spectral region in which said material has maximum emissivity and where said material transmits appreciable background radiation to prevent transmission of background radiation to the radiant-energy sensitive means thereby to effect an output from the radiant-energy sensitive means representative of the intensity of radiant energy in the spectral region throughout which said material has maximum emissivity. The system further includes means responsive to the output of the radiant-energy sensitive means for exhibiting the substantially true temperature of the translucent material.

Further in accordance with the invention the radiant-energy selective means may have the additional characteristic of blocking the transmission of radiant energy of wavelengths longer than the shortest wavelength of radiant energy of significant intensity characteristically reflected by the translucent material from other radiant energy sources to eliminate measurement errors due to reflection from the translucent material.

In one form of the invention the radiant-energy selective means comprises a band-pass filter having the aforesaid characteristics.

In accordance with the present invention, advantage has been taken of the fact that there is a region in the spectrum of radiant heat energy between three microns and eight microns in which glass has a low reflectivity and is substantially opaque for sections in the order of five millimeters thick. Due to the aforesaid characteristics of the glass for the radiant heat energy within the aforesaid band of wavelengths the glass radiates substantially as a black-body radiator; that is to say, the values of its reflectivity and of its transmissivity are low, approximating zero, and its emissivity high, approximating unity within said selected band. More particularly, a radiation-responsive device, such as a radiation pyrometer, is forcused upon the surface of the glass whose temperature is to be measured and there is transmitted to the sensitive element of the radiation-responsive device heat energy substantially solely within a range of wavelengths of three microns to eight microns inclusive, the resulting response being negligibly affected by reflection of radiant energy from the glass or transmission of radiant energy through the glass. Accordingly, the measuring system including the radiant energy responsive device may be calibrated in terms of temperature of the glass with the measurement error reduced far below what has heretofore been considered possible and the temperature measurement being of much greater accuracy than has heretofore been the case.

In accordance with a further aspect of the invention, the radiation pyrometer preferably includes as a component part thereof a filtering means characterized by the selective transmission therethrough of radiant energy within the selected range of three microns to eight microns with a characteristic which prevents substantial transmission of radiant energy of wavelengths outside of said range. The construction of the filter itself forms a part of the present invention and will be later described.

In accordance with a further aspect of the present invention the radiant-energy selective means comprises a first cut-off filter element having the characteristic of transmitting only radiant energy below the wavelength limit of about eight microns and a second cut-off filter element having the characteristic of transmitting radiant energy only below the wavelength limit of about four and one-half microns. The filter elements are arranged for successive disposition in the optical path between the translucent material and the radiant-energy sensitive means to provide successive readings the difference of which corresponds to the true temperature of the translucent material.

In accordance with a further aspect of the invention the radiant-energy sensitive means of the system comprises a pair of radiation pyrometers having matched output characteristics, one of the pyrometers being arranged to view the translucent material through the first cutoff filter element and the other of the radiation pyrometers being arranged to view the translucent material through the second cut-off filter element, the difference in the outputs from the pair of radiation pyrometers corresponding to the true temperature of the translucent material.

In accordance with a still further aspect of the invention the pair of radiation pyrometers in the system is electrically connected differentially to provide an output therefrom corresponding to the true surface temperature of the translucent material.

For a more complete understanding of the invention, reference is to be had to the following description taken in conjunction with the following drawings, in which:

Fig. 1 diagrammatically illustrates in perspective, with certain parts in section, an application of the invention to a lehr;

Fig. 1-A is a fragmentary perspective view looking into the radiation-receiving end of the pyrometer of Fig. 1;

Fig. 2 is a sectional view of the pyrometer and one end of the supporting tube 17 of Figs. 1 and 1-A in which both conduits 28 and 32 have been shown;

Fig. 3 is a sectional view on the line 3—3 of Fig. 2;

Fig. 4 is a side elevation of the sensitive-element assembly of the pyrometer of Figs. 1-3 including filtering means 34;

Fig. 4A is a fractional view of a modification of the filtering means of the sensitive-element assembly shown in Fig. 4;

Fig. 5 is a front elevation of the sensitive-element assembly as viewed through filter 34;

Figure 6:
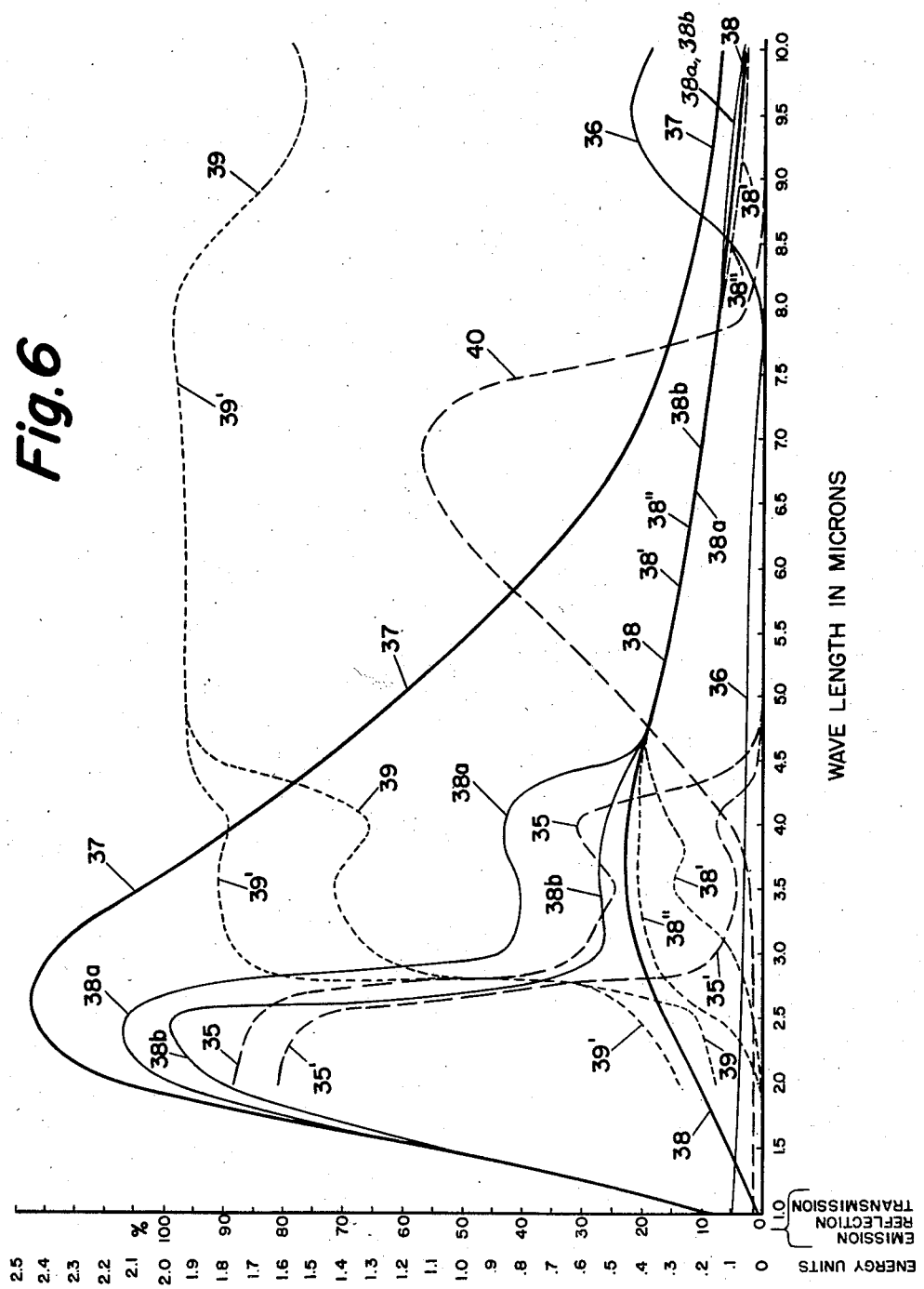

Fig. 6 includes a plurality of curves explanatory of the invention;

Figs. 7-10 diagrammatically illustrate other modifications of the invention;

Fig. 11 illustrates the differential thermopile useful in the modification of Fig. 10; and Figs. 12 and 13 illustrate the transmission characteristics of various filter materials useful in practicing the invention.

Referring to the drawings, the invention in one form has been shown as applied to the measurement of the temperature of a sheet of glass 10 supported on rolls 11 within a lehr 12 which is heated by any suitable means, such as represented by the heating resistors 13. Since the temperature within the lehr 12 may be relatively high, as of the order of 800° F. up to as high as 1200° F., the bearings of the rollers are preferably located exteriorly of the lehr and water-cooled as indicated by the inlet pipe 14 and the pipe sections 15 which interconnect the several bearings which appear in Fig. 1.

The heating resistors 13 will preferably be located both above and below the sheet of glass 10 which, it will be understood may have been formed or rolled and delivered to the lehr 12 for annealing. The lehr 12 usually will form a component part of a machine in which glass is gathered by forming rolls from a mass of glass maintained in molten condition in a glass furnace and after passage over a bending roll is delivered by carrying rolls to the supporting rolls 11 within the lehr. Driving rolls, not shown, may be located at the outlet end of the lehr to pull the glass through the lehr.

Since the sheet of glass 10 is in constant motion through the lehr 12, it will be seen at once that the measurement of the temperature thereof cannot be conveniently accomplished by attachment of thermocouples and the like to the glass itself. Moreover, as the glass enters the lehr 12 it may be in a semi-plastic state, another reason why attachment of thermocouples thereto would not be advisable. However, in accordance with the present invention, a radiation pyrometer 16 may be inserted through an opening 12a in a side wall of the lehr 12 with the lower end of the pyrometer held in close proximity with the glass sheet 10 passing therebeneath.

Alternatively, the pyrometer may be sighted through any suitable opening in the furnace upon a restricted area of the glass sheet, as for example through an opening in the roof of the furnace, where a pyrometer 16' has been illustrated by broken lines. Where the pyrometer is to be utilized to explore the temperature at various regions of the glass sheet within range of the opening 12a, the arrangement shown, including the supporting tube 17, will of course be used. The tube 17 is provided with flow passages therein for cooling water from an inlet 18 and also for flow of air from an inlet 19. The leads 20 from the pyrometer 16 are connected to any suitable type of measuring instrument 21, illustrated as including a scale 22 and a strip chart 23. The measuring instrument may be of the type disclosed in Squibb Patent No. 1,935,732 or of the type shown in Williams Patent No. 2,113,164. Radiation from the sheet of glass 10 is received through an opening 24, Fig. 1-A, provided in the lower end of the housing of the pyrometer 16.

As best shown in Fig. 2, the supporting tube 17 is threaded into a cast portion of a saddle 25 to which there is silver-soldered, as indicated at 26, Fig. 3, an outer cylindrical wall 27. A water inlet pipe or conduit 28 extends through the supporting tube 17 and through the saddle 25 for flow of cooling water in a spiral path formed by a spiral fin 29a on an inner wall 29 of the pyrometer 16, a water outlet channel 25a being provided for return flow of the water through the supporting tube 17. Thus, the radiant energy sensitive unit comprising the radiation receiver 30 and the sensitive element 31 comprising thermocouples attached to the receiver 30 are affected by a substantially uniform ambient temperature during measurement. The aforesaid unit may be of the type shown in Dike Patent No. 2,232,594. Radiant energy is directed to receiver 30 by a mirror 33. It is to be understood other forms of radiation pyrometers may be used with differently designed optical systems for focusing radiant energy from a selected area of the glass sheet 10 upon the sensitive element of the pyrometer.

Also extending through the tube 17 is a pipe or conduit 32 for flow of air under pressure into the cavity 32a adjacent the outlet 24. The inflowing air in flowing through the cavity 32a and the outlet 24 sweeps away gases and insures the absence of any airborne substances on and within the cavity including the window 34. The velocity of air flow is low enough to avoid cooling effect upon glass 10. The leads from the sensitive elements 31 extend through the air inlet pipe 32 which is, of course, sealed against ingress of water. While cooling water has been referred to, it is to be understood that any cooling fluid may be used in lieu thereof.

In a glass lehr the furnace atmosphere will in general be of uniform character, and hence will not materially affect the temperature measurement so that it is entirely feasible to support the radiation pyrometer 16' from the outside of a wall or the roof of the lehr to view a selected area of the glass disposed therebeneath, it of course being understood that such a pyrometer 16' would be connected to the measuring system as illustrated for the pyrometer 16. It is also contemplated that the roof may have a re-entrant portion if it be desired to locate the pyrometer nearer the glass and still have it mounted on the outside of the furnace wall. The re-entrant structure will be indicated where the furnace atmosphere is of a character to absorb a substantial amount of the radiant energy within the selected band, or is of variable radiation absorbing character.

With a total radiation pyrometer of conventional prior art type supported in the position illustrated in Fig. 1, it will, of course, be understood that radiation from below the glass sheet 10 would be transmitted through the glass and transmitted to the pyrometer. Such a pyrometer would also receive radiation reflected from the glass due to the heating resistors disposed above it. Because of these circumstances, temperature measurements for temperatures of the order of 1200° F. have been greatly in error; for example, by over 100° F. with a background temperature of 1500° F. Moreover, the error in temperature measurement with the conventional total radiation pyrometer will vary with change of background temperatures and radiation therefrom. For the purposes of the present specification and claims the term background radiation is defined as including the radiation from the surfaces, both above and below the surface of the glass sheet.

The effect of background radiation in producing errors in temperature measurements may be clearly seen from the curves illustrated in Fig. 6. Curves 37 and 38 respectively illustrate the energy distribution from a blackbody at temperatures of 1600° F. and 1000° F. with the ordinates being energy units expressed in watts per square centimeter per micron per $2\pi$ solid angle and the abscissae being wavelengths expressed in microns. Curves 38' and 38" respectively illustrate the energy distribution from glass sheets of two millimeters and five millimeters thickness at 1000° F. and in the absence of background radiation at different temperatures. To emphasize the errors in temperature measurement that arise from background radiation at different temperatures than the glass reference may be had to curves 38a and 38b. Curve 38a represents the energy that is viewed by a conventional total radiation pyrometer without a filter when it is focused on two millimeter glass at 1000° F. with background radiation of 1600° F. Curve 38b represents the energy that is viewed by a conventional total radiation pyrometer without a filter when it is focused on five millimeter glass at 1000° F. and with background radiation of 1600° F. It will be observed from curves 38a and 38b that a substantial amount of the total radiant energy received by the pyrometer lies above the blackbody curve 38 which represents blackbody radiation at 1000° F. and thus, in the absence of the present invention the pyrometer will provide a temperature reading greatly in error.

In prior art arrangements for measuring temperatures of glass it has been proposed to use a Pyrex lens about five millimeters thick which transmits radiant energy in a wavelength band between 0.03 micron and 2.6 microns. A radiation pyrometer equipped with such a lens has been said to be desirable to measure temperatures at a considerable depth within a large mass of glass. In order to obtain pyrometer readings by prior art methods as representative as possible of the true temperature of glass it has been propsed to use a radiation pyrometer equipped with a fused silica lens of similar thickness, in preference to one having a Pyrex lens, the fushed silica lens having the characteristic of transmitting equally well throughout the band transmitted by the Pyrex lens and in addition transmitting fairly freely in the wavelength band from 2.6 microns to around 3.8 microns.

Reference to curves 38a and 38b, Fig. 6, at once shows that a pyrometer that responds only to radiation below the wave-length of 2.6 microns such as a pyrometer equipped with a Pyrex lens or a pyrometer that responds only to radiation blow the wavelength of about 3.8 microns such as a pyrometer equipped with a fused silica lens will provide outputs that are to a substantial degree affected by the background radiation as the background radiation makes up a substantial portion of the energy received by the pyrometers. Under such conditions it would be impossible accurately to measure the temperature of the glass surface.

In accordance with the modification of the present invention illustrated in Figs. 1–5, the effect of the energy transmitted through and/or reflected from the glass sheet 10 is overcome by applying to the radiation receiver 30 of the radiation pyrometer 16 radiant energy from the glass sheet 10 within a selected range of wavelengths, of from three microns to eight microns. The passage of this restricted wavelength band of radiant energy to the radiation receiver 30 is accomplished by the provision of a filter 34 located in the optical path between the receiver 30 and the glass 10, as between receiver 30 and the opening 24. In one form of the invention, the filter 34, Figs. 2 and 4, comprises a window of lithium fluoride (LiF). Lithium fluoride of one-millimeter thickness has the property of freely passing radiant energy below about ten microns but does not pass radiant energy of wavelengths substantially above ten microns. In order to prevent passage of radiant energy below wavelengths of about three microns and above about eight microns, at least one face of the filter 34 is coated with particulate matter, for example silica or quartz flour of particle sizes ranging from three microns to six microns. An additional filtering element 34a (Fig. 4–A) may be included as a separate optical element comprising mica, sapphire, or lithium fluoride, the latter of greater thickness, for example, about eight millimeters, to control the upper limit, for example the cut-off at about seven microns, or the coating may be added to the thicker lithium fluoride or to the other material.

In accordance with the present invention, the coating may be formed by suspending the silica flour within a small amount of a suitable solvent such as methyl ethyl ketone to which there may be added a slight amount of silicone. More particularly, there will be suspended in fifteen cubic centimeters of said ketone a half cubic centimeter of the silica flour to which there has been added a binder, for example approximately four drops of a silicone in solution of the type available on the market under the name of Dow Corning 803, preferably in mixture with the ketone before addition of the silica flour. For a filter of diameter of about two centimeters it has been found that about six drops of the foregoing mixture will result in a coating of satisfactory character and thickness. When the foregoing mixture has dried at a relatively low evaporation rate, which may be controlled by convering the filter with a watch glass, the filter is then baked for a suitable period of time, two hours at 130° C. being found satisfactory. A filter constructed as described will exhibit a maximum transmission characteristic between six and one-half microns and seven and one-half microns with relatively sharp cut-off below about 3.8 microns and above about 7.9 microns.

By varying the particle size of the silica flour, the short wavelength transmission limit can be varied from the sharp cut-off point of 3.8 microns in either direction. If the particle size is reduced, the sharp cut-off point will be at a lower wavelength than 3.8 and may be as low as three microns. In general, a lower limit of about 3.8 microns will be preferred, the reason being set forth more in detail in connection with the description of Fig. 6.

The importance of the transmission characteristics of the radiation pyrometer thus far described will be best understood by reference to Fig. 6. The curve 35 plotted with transmissivity as ordinates against wavelengths as abscissae illustrates the transmission characteristic of a glass and shows that for wavelength below about four microns the transmission of radiant energy through the glass is relatively high. Curve 35 is for a typical example comprising a glass two millimeters thick. For the same glass the reflectivity is shown by the curve 36 and is relatively high in the region just above eight microns. Its reflectivity has a short-wave cut-off at about eight microns. Curve 35' shows the transmission characteristics for the same composition of glass five millimeters thick.

The effectiveness of the filter 34 in overcoming the effects of radiation transmitted through the glass and of radiation reflected from the glass will be apparent by reference to the graph 39 which illustrates the emissivity of the glass sheet of two-millimeter thickness and indicates that the radiation emitted from the glass abruptly rises for wavelengths above two and one-half microns with more than 95% being emitted in the spectral region between four and one-half and eight microns and abruptly decreases for radiation above about eight microns. Within the range of about four and one-half microns to about eight microns there will be a substantial amount of radiant energy due solely to the temperature of the glass and relatively unaffected by radiation transmitted therethrough or reflected therefrom. As indicated by the curve 40, with percent transmission for the filter 34 as ordinates, it will be seen that full advantage has been taken of the region in which the glass has a high emissivity and within which region the transmissivity and reflectivity of the glass are both low.

Since the filter 34 restricts the radiant energy transmitted to the radiation receiver 30 to the selected range from about four and one-half microns to about eight microns and inasmuch as there is a substantially uniform emissivity of the glass for radiation within that selected band of wavelengths, the total radiation directed upon the receiver 30 will vary with change in temperature of the glass and will be unaffected by either transmission of energy through the glass or reflected from the glass. Thus full advantage is taken of the fact that the glass in the selected band of wavelengths is substantially opaque to radiant energy within that selected band as evidenced by the low value of transmissivity for the band of wavelengths between about four and one-half microns and about eight microns. Full advantage is also taken of the fact that for the selected band of wavelengths the glass sheet appears to the pyrometer as a black-body radiator as evidenced by the fact that the reflectivity throughout the selected range is of a very low order and does not rise to consequential degree until above about eight microns.

There is utilized in accordance with the present invention that band of wavelengths for which the emissivity of the glass approximates unity inasmuch as the reflectivity and transmissivity of the glass for the selected band of wavelengths are both of a very low order, approximating zero. Thus the filter has a dual purpose; one, in preventing transmission of the energy due to the high transmissivity of the glass in the region below about four and one-half microns, and the other in preventing transmission of radiant energy due to reflection from the glass in the region above about eight microns. By increasing the thickness of the lithium fluoride, the upper limit may be decreased to about seven microns. However, the quartz or silica flour coating is itself effective for a cut-off at about eight microns with varying particle sizes.

Further in accordance with the invention, the body of the filter may be of other than lithium fluoride. For example, it is found it may comprise calcium fluoride and in place of the quartz or silica flour there may be utilized finely ground bentonite and other clays having particle sizes averaging between about three microns and six microns, depending upon the requirements.

The lithium fluoride, or the calcium fluoride, may have a polished surface or it may be sandblasted for increased adherence of the coating thereon. It has been found that with the sandblasted surface transmission characteristics are as satisfactory as with the polished surface.

It is to be understood that the curves of Fig. 6 may be taken as exemplary of glasses at varying thicknesses and temperatures, the selected band of wavelengths being approximately the same for the several cases since for many glasses the emissivities thereof will be substantially unity for the selected band of wavelengths.

For example, the invention is applicable to the temperature measurement of not only the many glass compositions used for windows and various kinds of glassware, but also to objects having vitreous coatings, and to synthetic transparent materials such as the methacrylates sold under the trade names of "Lucite" and "Plexiglas," to quartz-bearing ceramics, glazed brick, and to phenolic condensation products such as Bakelite. In general, the invention is applicable to any materials of which the foregoing may be taken as examples, which are transparent to the band of wave-lengths between about .7 micron and four microns, and particularly to those applications where background temperature and radiation represent a substantial source of error.

Again referring to Fig. 6, if the glass sheet 10 were of a greater thickness than the two millimeters referred to, the transmissivity of the thicker glass would drop off at lower or shorter wavelengths, as shown by the curve 35' for a glass five millimeters in thickness. Thus, for the measurement of the thicker glass, and for the measurement of temperatures of other materials where there is sharp cut-off in its transmissivity in the region of three microns, the filter 34 will be designed for a wider band than the four and one-half microns to eight microns range for curve 35 of Fig. 6. In general, the range of four and one-half microns to eight microns will be preferred for an instrument of general application but for those applications where there is sharp cut-off in the region of three microns there will be an advantage in providing a filter which includes a lower or shorter wave limit for the band because additional radiant energy will be available. As may be noted from the curves 35' and 39', for glass five millimeters thick the curve 35' drops to a negligibly low value at approximately three microns so that no interfering radiant energy will be transmitted by the glass beyond this wavelength and the emissivity rises sharply and is of a substantial amount, beginning at about three and one-half microns. Thus, additional radiant energy can be made available for greater output of the sensitive element of the pyrometer 16.

For the measurement of the temperature of many substances transparent to radiant energy within the range of .5 micron to about two and one-half microns, the transmissivity in general is relatively high. However, change of thickness or change of composition of the material will greatly affect the transmissivity in the region between about two and one-half microns and about four and one-half microns. Thus, by restricting the selected band to between four and one-half microns and about eight microns, the temperature measurement will not be affected by change in thickness or in composition of the material. The importance of this aspect of the invention will be fully apparent by considering the continuous measurement of the temperature of the moving glass sheet of Fig. 1 in which the thickness thereof is likely to change to some degree. Its composition may also vary to some extent and as between different glasses there may be widely differing compositions of the glass to be heat-treated in the lehr. Since the system is not affected by thickness and compositional changes it can, in accordance with the present invention, be utilized for successive temperature measurement of glasses of different compositions undergoing manufacture in different locations in the glass factory. There is provided a mobile instrument of general utility rather than one useful only in a fixed location.

Further in accordance with the invention, advantage may be taken of the relationship of the long-wave cut-off of the transmissivity of the material under measurement and the short-wave cut-off of the filter. By lowering the short-wave cut-off of the filter until it slightly overlaps the long-wave cut-off of the material under measurement, the sensitive element of the radiaion pyrometer will "see" below the surface of the material under measurement. Stated differently, the radiation within the selected band will include an additional component due to radiation from the interior of the semi-transparent material. The additional feature is particularly useful in connection with glass blowing and other operations where the surface temperature may differ from the temperature of the material below the surface and the measurement is to take into account the sub-surface temperature of the material without material error due to background radiation effects. More particularly, for the glass of two-millimeter thickness a reduction in the short-wave cut-off of the filter to about three and one-half microns will cause the sensitive element then to see below the surface of the material.

It is to be further observed that for the glass of five millimeter thickness it is permissible to utilize a filter having a short-wave cut-off as low as about three microns for some subsurface response through one with a short-wave cut-off at about four and one-half microns would be preferred as shown by graph 35' where no sub-surface sighting is desired. A cut-off less than about three microns would seldom be desired.

It is to be further understood the filter characteristics may also be varied by changing the thickness of the coating on element 34. For example, as the thickness of the coating increases, the short-wave cut-off is moved toward the longer wavelengths, and vice versa. Where the quartz flour particle sizes are made larger, as for example, around twenty-eight microns, the long-wave cut-off of the filter will be at about six microns.

Where the measurements are made under conditions where radiant energy reflected is of a negligibly low value, the filter need not possess a long-wave cut-off characteristic.

Reference to Fig. 6 will make clear the use of the long-wave and short-wave cut-off points. For example, the long-wave cut-off of transmissivity of one glass occurs, curve 35', at about three microns. The short-wave cut-off of the filter 34, curve 40, occurs at a longer wavelength, as at 3.8 microns. The short-wave cut-off of reflectivity, curve 36, occurs at about eight microns, while the long-wave cut-off of filter 34, curve 40 also occurs at about eight microns. Thus, the selected band has a short-wave cut-off equal to, or of greater wavelength than, the long-wave cut-off of transmissivity, while the long-wave cut-off of the filter 34 is equal to, or of shorter wavelength than, the short-wave cut-off of reflectivity. The foregoing states in detail the fact that the band selected by the particular filter utilized is one in which the emissivity of the material under measurement for that band is substantially unity and, hence, appears to the sensitive element as a black-body radiator.

While for most applications it may be preferable to use a radiation pyrometer equipped with a band-pass filter such as described for use with the embodiment illustrated in Figs. 1–5, in some applications it may be desirable to measure the temperature of the glass or similar material by making successive readings with a single radiation pyrometer. Such an arrangement is illustrated diagrammatically in Fig. 7. The radiation pyrometer indicated by reference character 50 is supported to view the glass sheet 10 through an opening in the top of lehr 12 similar to pyrometer 16' illustrated in Fig. 1. Pyrometer 50 may be of the type disclosed in the aforesaid Dike Patent No. 2,232,594 or it may be of the type described and claimed in Fastie Reissue Patent No. 23,615. The pyrometer 50 is equipped with a window 51 or other means to render the instrument responsive to substantially only the radiant energy in the spectral region below about eight microns. While the window 51 may comprise any suitable material, for the purposes of explanation, the window 51 may be made of lithium fluoride approximately 3/64 inch thick. The transmission characteristic of lithium fluoride having a thickness of about 3/64 inch is illustrated by curve 53, Fig. 12 showing that such material freely transmits radiant energy in a spectral region below or of wavelengths shorter than seven microns and transmits only a very small amount of radiant energy beyond or of wavelengths longer than eight microns. Instead of using lithium fluoride for window 51 in some applications it may be preferable to use calcium fluoride which will transmit freely in the infrared region of the spectrum up to and beyond eight microns and in conjunction therewith use a piece of fused silica in the order of 0.0005 inch thick. The latter arrangement will provide a sharper cut-off in the eight micron region of the spectrum as indicated by curve 54 in Fig. 12. If the pyrometer construction is of the type disclosed in said Reissue Patent No. 23,615 the fused silica may be placed over the internal diaphragm aperture of the radiation pyrometer disclosed and thus, its size may be relatively small as compared to the area of filter 34 utilized in the type of pyrometer illustrated in Fig. 2. As a further alternative instead of using a thin section of fused silica it may be preferable to use thin glass ribbon in the order of 0.0015 inch to 0.001 inch thick. Such glass ribbon is made of an alkali lead silicate such as that disclosed in Patent No. 2,431,980. Glass ribbon of such type transmits radiant energy in accordance with the transmission curves 55 and 56 illustrated in Fig. 13. Curve 55 represents the transmission characteristic for the aforesaid glass strip having a thickness of 0.0015 inch and curve 56 represents the transmission characteristic for the aforesaid glass strip having a thickness of 0.001 inch. Other materials that may be used and have suitable transmission characteristics include India mica or Angola mica each in the order of 0.001 inch thick. The transmission characteristics of India and Angola mica are illustrated by curves 57 and 58 respectively in Fig. 13.

It is to be understood that the foregoing specific materials, which are suitable for use in the optical path to establish the long wave cut-off of transmissivity to the sensitive element of the radiation pyrometer so that the sensitive element will not receive significant amounts of radiant energy other than the desired wavelengths, have been set forth by way of example and not by limitation and that other means may be used to accomplish the end result.

With the pyrometer 50 equipped with a window 51 transmitting radiant energy up to a cut-off limit of about eight microns there is further provided a filter plate 59 which may be formed from fused silica about 0.030 inch thick or greater. The filter plate 59 is supported on an arm 60 the latter being pivoted at 61 for movement in a horizontal plane as by operation of handle 62. By this arrangement the filter plate 59 may be moved selectively into and out of the optical path between the pyrometer 50 and the glass sheet 10 to effect a change in the long wave cut-off of transmissivity in the path of radiant energy directed to the sensitive element of the radiation pyrometer from the glass the temperature of which is to be measured. The transmission characteristic of a fused silica plate having a thickness of about 0.030 inch is illustrated by curve 63 in Fig. 12. It will be observed that such a plate transmits radiant energy freely in the wavelength band below or at wavelengths shorter than about 4.5 microns and has a cut-off at approximately 4.75 microns.

The radiation pyrometer 50 is connected in a measuring circuit of any suitable type, and shown in Fig. 7 as comprising a potentiometer including a source of supply 65, a variable resistor 66, slidewire 67 with associated scale 68 and adjusting knob 69 for the contact associated with slidewire 67 and the index for scale 68, and a null detector illustrated as a galvanometer G. A standard cell SC may be provided for calibrating or standardizing the network with a transfer switch 70 in its right-hand position.

The following is a description of the method of operating the system shown in Fig. 7. A reading is first obtained with the filter 59 positioned out of the line of sight of the radiation pyrometer 50. The knob 69 is turned to adjust the slidewire 67 to bring the potentiometer network to balance and thus, produce zero deflection of the galvanometer G. At this time the index 68a which moves concurrently with the slidewire contact 67a indicates on scale 68 a value which corresponds to a measure of the intensity of the radiant energy received by the sensitive element of the radiation pyrometer in the spectral region up to the cut-off point of the window 51 such cut-off being at approximately eight microns. Thus, while the glass sheet 10 may be transmitting along the optical path toward the pyrometer 50 radiant energy in the wavelength band above eight microns the window 51 will prevent the pyrometer 50 from receiving wavelengths longer than approximately eight microns. The indicated reading which may be in any suitable terms such as millivolts is recorded for future reference. The filter plate 59 is then moved into the path of radiant energy being transmitted from the glass sheet 10 to pyrometer 50 and the potentiometer network is again adjusted for balance by knob 69. When galvanometer G indicates that a balance has been obtained the pointer 68a will indicate on scale 68 a reading representative of the intensity of radiant energy in the spectral region below the cut-off point of approximately four and one-half microns of filter plate 59. By subtracting the reading obtained with the filter plate 59 from the reading obtained without the filter plate 59 there will be obtained a differential value representative of a measure of the intensity of the radiant energy in the wave band from approximately four and one-half microns to approximately eight microns. By referring to Fig. 6 it will be seen that between the wavelengths of approximately four and one-half microns and eight microns the curves 38a and 38b coincide with curve 38 which is the energy curve of a blackbody at the temperature of 1000° F. Accordingly, when utilizing the dual reading or differential reading method of this invention and obtaining the output corresponding to the radiant energy within the waveband between 4.5 and 8 microns such output will correspond to the substantially true temperature of the glass regardless of the temperature of the background radiation. It will be further observed that the radiation in the wavebands heretofore employed in prior art systems for measuring glass temperature will be entirely eliminated from the temperature measurement obtained in accordance with the present invention.

In practicing the modification of the invention illustrated in Fig. 7 it will be observed that the filter plate 59 should have transmission characteristics such that the transmission characteristic of filter 59 and window 51 in combination will be approximately as good in the shorter wavelength region of the spectrum as those of the window 51 alone; otherwise errors may be introduced because of failure entirely to eliminate from the resultant output the effects of radiation below four and one-half microns. Since the cut-off points of the materials for the window 51 and the materials for the filter plate 59 are relatively sharp, it is preferable to limit the band of wavelengths utilized in the temperature measurement to those between about four and one-half and eight microns. However, when a band-pass filter is used such for example as in the embodiment disclosed in Figs. 1–5 since its transmission curve rises rather gradually and passes only a small amount of radiant energy between three and four and one-half microns, such band-pass filter may pass radiation between three and eight microns and still provide a substantially true temperature measurement of the glass.

In another form of the invention two radiation pyrometers may be utilized, such for example as matched radiant-energy pyrometers 50a and 50b in Fig. 8. Pyrometer 50a is illustrated as being equipped with a window 51 and pyrometer 50b is illustrated as being equipped with filter plate 59. It will also be understood that pyrometer 50b may additionally include a window 51; however, this is not necessary. The two pyrometers 50a and 50b are disposed to view a common area of the glass sheet 10 in the lehr 12. By means of a transfer switch 70 the potentiometer measuring circuit is connected first to the radiant-energy detector or pyrometer 50a and then to the pyrometer 50b. The reading obtained with pyrometer 50b in the circuit is subtracted from the reading obtained with pyrometer 50a in the circuit to provide a differential reading corresponding to the true temperature of the glass sheet 10 in a manner similar to the temperature measurement obtained with the system in Fig. 7.

In both Figs. 7 and 8 the scale 68 may be calibrated in any suitable manner such as from zero to one hundred with the scale indicating at balance not the temperature of the glass but merely at what point on the scale balance was obtained. While in Figs. 7 and 8 the variable type slidewire 67 has been diagrammatically illustrated as adjustable, it will be understood that the resistor element of slidewire 67 may be mounted upon a rotatable element for rotation relative to a fixed contact. The scale 68 may be either directly associated with the rotatable slidewire, or driving connections driven by knob 69 may be utilized to drive an indicator relative to an associated scale or to drive a pen relative to a chart.

In the form of the invention illustrated in Fig. 9 the radiation pyrometers 50a and 50b have been connected differentially in series opposition with their differential output being applied to the input of recorder 21. The recorder 21 preferably is calibrated in terms of temperature and thus a direct indication of the temperature of the glass is indicated on scale 22 and recorded on chart 23.

In the form of the invention illustrated in Fig. 10 the pair of matched radiant-energy pyrometers 50a and 50b have been replaced by a differential thermopile employed in a dual beam instrument generally of the type illustrated and described in copending application Serial No. 142,795, filed February 7, 1950, by William G. Fastie, now Patent No. 2,737,809. The instrument 79 includes a differential thermopile having two target areas 81 and 82 respectively. The sensitive element or thermopile 80 is shown in plan view in Fig. 11 and is more fully disclosed in aforesaid Patent No. 2,737,809. Briefly, it comprises a plurality of thermocouples 80a, the even numbered junctions of which would ordinarily correspond with the hot junctions being cemented to a radiation receiver or target 81 while the odd numbered junctions of the thermocouples which would normally correspond with the cold junctions being cemented to the radiation receiver or target 82. The sensitive element 80 is supported from a ring 83 by means of fine wires 84, two of which, 84a and 84b, form leads to the sensitive element 80. The ring 83 is suitably mounted in the radiant-energy detector head which is in turn supported by the lehr 12. As shown the supporting wires 84 may comprise extensions of corresponding wires of the thermocouples extending diametrically of the ring 83 and attached at opposite ends thereto by suitable means such as cement indicated by the area 83a in Fig. 11. The output of the radiant-energy detector or radiation pyrometer 79 will be a function of the difference between the temperatures of the target areas or radiation receivers 81 and 82 and these temperatures will, of course, depend upon the intensity of the beams of radiant energy 81a and 82a respectively directed thereon.

In the modification of Fig. 10 it will be observed radiant energy beams 81a and 82a are derived from adjacent areas of the surface of the glass sheet 10. Beam 81a passes through opening 79a in the pyrometer head and through filter element 51 after which it is reflected by concave mirror 86 onto the radiation receiver 81. Beam 82a passes through opening 79b and filter element 59 after which it is reflected by the mirror 86 onto the radiation receiver 82. Thus it will be observed that the radiant energy received by target 81 comprises energy in the same band of wavelengths as that received by pyrometer 50a in Fig. 9 and target 82 receives radiant energy in the same band of wavelengths as radiation pyrometer 50b in Fig. 9. Accordingly, the output from the sensitive element 80 of pyrometer 79 in Fig. 10 will correspond to the output derived from the differentially connected pyrometers 50a and 50b of the modification illustrated in Fig. 9.

While the modifications illustrated in Figs. 7 and 8 have been shown and described in connection with manual operation, it is to be understood that the systems of Figs. 7 and 8 may be made automatic without departing from the spirit or scope of the applicants' invention. For example, the filter 59 in Fig. 7 may be included as a part of a revolving sector disc for cyclically moving the filter into and out of the line of sight of pyrometer 50. Additionally, there may be provided commutating means and a memory device such as a capacitor which may be charged to the measured value or a slidewire and contact relatively adjusted by automatic means well known in the recorder art either of which would be representative of the first reading of the radiation pyrometer 50. The measured value held by the memory device may then automatically be compared with the measured value representative of the second reading of the radiation pyrometer and the resultant difference indicated and/or recorded. Systems of this type may employ recorders of the general type illustrated in the aforesaid Williams Patent No. 2,113,164. It is believed clear that the modification of the system illustrated in Fig. 8 may be similarly altered for automatic operation and thus, it is not believed necessary to elaborate here on the details. Likewise, while the modifications illustrated in Figs. 9 and 10 are automatic in their operation it is to be understood that they may be manually operated along lines similar to the modification illustrated in Fig. 8.

In the modifications illustrated in Figs. 8, 9 and 10 the transmission characteristics of filter 59 and window 51 should be substantially the same within the band of wavelengths below four and one-half microns. However, filter and window materials may be used which do not match within this region provided an adjustment is made by means of a trimmer or trimmers to make the response of pyrometers 50a and 50b or receivers 81 and 82 the same for energy within this band. This insures elimination from the resultant output of the system the effects of radiation below four and one-half microns.

Summarizing the foregoing the applicants have disclosed various methods and apparatus for more accurately measuring the true temperature of materials which are transparent or translucent to thermal radiation in one region of the spectrum, good absorbers and hence good emitters of thermal radiation in another region of the spectrum, and in some cases highly reflecting of thermal radiation in a third region. While glass has been used as the principal example throughout the specification for illustrative purposes of a translucent or transparent material, this is not to be construed as a limitation as the invention is applicable and useful in the art of measuring the temperature of any non-opaque material having the foregoing characteristics.

For brevity in the claims the term "translucent material" is used generically to designate non-opaque bodies whether they be translucent or transparent.

It shall be understood that the invention is not limited to the specific arrangements shown and that changes and modifications may be made within the scope of the appended claims.

What is claimed is:

1. A system for measuring the temperature of translucent materials such as glass, under conditions wherein the material may be subject to background radiation from sources at a different temperature, in avoidance of measurement errors due to transmission of background radiation through said material comprising radiant-energy sensitive means disposed to receive radiant energy from the material, radiant-energy selective means disposed in the optical path between said radiant-energy sensitive means and said material, said radiant-energy selective means effecting segregation of radiant energy in preselected spectral bands, said radiant-energy selective means and said radiant-energy sensitive means coacting to produce an electrical output characteristic of said radiant-energy sensitive means of a magnitude representative of the intensity of substantially only that radiant-energy which is emitted by said translucent material within a region of the spectrum throughout which said material has high emissivity to the substantial exclusion of the background radiation, and means under the control of said electrical characteristic for exhibiting the substantially true temperature of said material.

2. A system for measuring the temperature of translucent materials such as glass, under conditions wherein the translucent material may be subject to background radiation from sources at different temperatures, which system avoids measurement errors due to transmission of background radiation through said material, comprising radiant-energy sensitive means disposed to be heated by radiant energy from said material, radiant-energy selective means disposed in the optical path between said radiant-energy sensitive means and said material, said radiant-energy selective means having the characteristic of transmitting to the radiant-energy sensitive means radiant energy of wavelengths in a spectral region throughout which said translucent material has maximum emissivity, said radiant-energy selective means having the further characteristic of blocking the transmission of radiant-energy of wavelengths shorter than those of said spectral region in which said material has maximum emissivity and where said material transmits appreciable background radiation to prevent transmission of background radiation to said radiant-energy sensitive means thereby to effect an output from said radiant-energy sensitive means representative of the intensity of radiant energy in said spectral region throughout which said material has maximum emissivity, and means responsive to the effective output of said radiant-energy sensitive means for exhibiting the substantially true temperature of said material.

3. A system according to claim 2 wherein said radiant-energy selective means comprises a band-pass filter having the characteristics of passing only radiant energy of wavelengths between about three microns and about eight microns.

4. A system according to claim 2 wherein said radiant-energy selective means comprises a first cut-off filter element having the characteristic of transmitting only radiant energy below the wavelength limit of about eight microns and a second cut-off filter element having the characteristic of transmitting radiant energy only below the wavelength limit of about four and one-half microns, said filter elements being arranged for successive disposition in the optical path between said translucent material and said radiant-energy sensitive means to provide successive readings, the difference of which corresponds to the true temperature of the translucent material.

5. A system according to claim 2 wherein said radiant-energy selective means comprises a first cut-off filter element having the characteristic of transmitting only radiant energy below the wavelength limit of about eight microns and a second cut-off filter element having the characteristic of transmitting radiant energy only below the wavelength limit of about four and one-half microns, and said radiant-energy sensitive means comprises a pair of radiation pyrometers having matched output characteristics, one of said pyrometers being arranged to view the translucent material through said first cut-off filter element and the other of said radiation pyrometers being arranged to view said translucent material through said second cut-off filter element, the difference in the outputs from said pair of radiation pyrometers corresponding to the true temperature of said translucent material.

6. A system according to claim 5 wherein said pair of radiation pyrometers are electrically connected differentially.

7. A system according to claim 2 wherein said radiant-energy selective means comprises a first cut-off filter element having the characteristic of transmitting only radiant energy below the wavelength limit of about eight microns and a second cut-off filter element having the characteristic of transmitting radiant energy only below the wavelength limit of about four and one-half microns, and said radiant-energy sensitive means comprises a pair of differentially connected sensitive elements, one receiving radiation transmitted through said first cut-off filter element and the other receiving radiation transmitted through the second cut-off filter element to provide an output from said differentially connected sensitive elements corresponding to the true surface temperature of the translucent material.

8. A system according to claim 2 wherein said radiant-energy selective means comprises a band-pass filter having the characteristics of passing only radiant energy of wavelengths between about four and one-half microns and about eight microns.

9. A black-body calibrated radiation pyrometer for measuring the true surface temperature of selectively transparent and reflective materials such as glass under conditions wherein said materials reflect and transmit radiant energy from sources whose temperatures may differ from said surface temperature comprising a housing including radiant-energy responsive means supported therein, and filtering means disposed between said radiant-energy responsive means and the surface the temperature of which is to be measured having the characteristic of transmitting substantially only radiant energy within a band of wavelengths throughout which the emissivity of the material under measurement is substantially unity so as to eliminate errors due to the transmissivity and the reflectivity of the material.

10. A system for measuring the surface temperature of transparent materials in which the material itself is in terms of the measuring system made to simulate a black-body radiator comprising a radiation pyrometer including a silica-coated lithium fluoride filter for transmission of radiation only in the band of wavelengths between and including four and one-half microns and about eight microns, the transparent material as viewed by the pyrometer through said filter appearing as a black-body radiator.

11. A system as set forth in claim 10 wherein said silica-coated lithium fluoride filter comprises a plate of lithium fluoride transparent throughout said band and a coating of silica particles carried thereby, the particle size and the thickness of said coating determining the cut-off point at one end of said band of wavelengths and the thickness of said plate determining the cut-off point at the opposite end of said band of wavelengths to prevent passage through said filter of radiant energy of wavelengths transmitted and reflected by said material from sources at temperatures which may differ from that of the surface of said material.

12. A system as set forth in claim 10 wherein said silica-coated lithium fluoride filter comprises a first plate of lithium fluoride transparent throughout said band having a coating of silica particles carried thereby, the particle size and the thickness of said coating determining the cut-off point at one end of said band of wavelengths to prevent passage through said filter of radiant energy transmitted through said transparent material, and a second plate of lithium fluoride transparent throughout said band and having a predetermined thickness for controlling the cut-off point at the opposite end of said band of wavelengths to prevent passage through said filter of radiant energy reflected by said transparent material.

13. A system for measuring the surface temperature of transparent materials such as glass in which the glass itself is in terms of the measuring system made to simulate a black body comprising a radiation pyrometer including a silica-coated lithium fluoride filter for transmission of radiation only in the band of wavelengths between and including three microns and eight microns, the transparent material such as glass as viewed by the pyrometer through said filter appearing as a black body in avoidance of errors due to reflection therefrom and transmission therethrough of background radiation of higher intensity than the intensity of radiation from the glass.

14. A temperature measuring system for transparent materials of the type which are substantially opaque with respect to a selected band of wavelengths of radiant energy comprising a radiation pyrometer including a bentonite-coated calcium fluoride filter for transmission of radiation only in the band of wavelengths between and including three microns and eight microns for passage of radiant energy only within said selected band, part of said radiant energy being emitted from the surface of the transparent material and part of said radiant energy being transmitted from the interior of said transparent material for producing an output from said radiation pyrometer which is related to the sub-surface temperature of said transparent material.

15. A system as set forth in claim 14 wherein said bentonite-coated calcium fluoride filter comprises a plate of calcium fluoride transparent throughout said band and a coating of bentonite particles carried thereby, the particle size and the thickness of said coating determining the cut-off point at one end of said band of wavelengths and the thickness of said plate determining the cut-off point at the opposite end of said band of wavelengths to prevent passage through said filter of radiant energy of wavelengths transmitted and reflected by said material from sources at temperatures which may differ from that of the surface of said material.

16. A system as set forth in claim 14 wherein said bentonite-coated calcium fluoride filter comprises a first plate of calcium fluoride transparent throughout said band having a coating of bentonite particles carried thereby, the particle size and the thickness of said coating determining the cut-off point at one end of said band of wavelengths to prevent passage through said filter of radiant energy transmitted through said transparent material, and a second plate of calcium fluoride transparent throughout said band and having a predetermined thickness for controlling the cut-off point at the opposite end of said band of wavelengths to prevent passage through said filter of radiant energy reflected by said transparent material.

References Cited in the file of this patent

UNITED STATES PATENTS

| | | |
|---|---|---|
| 2,232,594 | Dike | Feb. 18, 1941 |
| 2,366,285 | Percy et al. | Jan. 2, 1945 |
| 2,561,077 | Tilton | July 17, 1951 |

FOREIGN PATENTS

| | | |
|---|---|---|
| 539,420 | France | June 26, 1922 |

OTHER REFERENCES

Powers, "Electronics," April 1937, pages 12–15.

Harrison: "Journal Optical Society of America," vol. 35, No. 11, November 1945, Industrial Use of Radiation Pyrometer, pages 710–714.

Mouzon-Dyer: Journal of the Optical Society of America, vol. 39, No. 3, pages 203–209, March 1949, Low Temperature Radiation Pyrometer in Industry.